Patented Dec. 8, 1953

2,662,092

UNITED STATES PATENT OFFICE 2,662,092

CYCLOALKYL ESTERS OF BASICALLY SUBSTITUTED ISOCYCLYLCARBAMIC ACIDS AND THEIR SALTS

John W. Cusic, Skokie, Ill., assignor to G. D. Searle & Co., Chicago, Ill., a corporation of Illinois No Drawing. Application December 26, 1951, Serial No. 263,510

11 Claims. (Cl. 260—471)

The present invention relates to a new group of organic esters and, more particularly, to cycloalkyl esters of basically substituted carbamic acids and their salts. The esters which constitute this invention can be represented as the compounds of the following structural formula

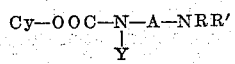

and their salts, wherein Cy is a lower cycloaliphatic hydrocarbon radical, Y is an isocyclic hydrocarbon radical containing 3 to 15 carbon atoms, A is a bivalent, saturated, aliphatic hydrocarbon radical containing at least 2 carbon atoms, and NRR' is either a lower dialkylamino radical or a nitrogen-containing, saturated heterocyclic radical attached to the radical A through a nitrogen in the heterocycle.

In the foregoing structural formula Cy represents a lower cycloalkyl radical containing 3 to 6 carbon atoms in nuclear position such as cyclopropyl, cyclobutyl, cyclopentyl, cyclohexyl, methylcyclopentyl and ethylcyclohexyl.

The radical Y can be a hdrocarbon radical classified by the Beilstein system as an isocyclic hydrocarbon radical and contains between 3 and 15 carbon atoms inclusive. The radical Y thus can represent a lower aromatic hydrocarbon radical containing 6 to 15 carbon atoms such as phenyl, tolyl, xylyl, naphthyl, methylnaphthyl, and fluorenyl, phenanthryl and anthracyl. Y can also be a lower phenylalkyl radical such as benzyl, phenethyl, phenylpropyl, methylbenzyl and ethylbenzyl as well as a hydrogenated derivative thereof such as dihydrobenzyl, tetrahydrobenzyl, and hexahydrobenzyl or a lower cycloalkyl radical as defined above.

The bivalent radical A is a saturated, aliphatic hydrocarbon radical containing 2 to 8 carbon atoms which can be arranged in straight and branch-chained configuration. These radicals can be derived from ethylene, propylene, butylene, amylene, hexylene or polymethylene radicals such as trimethylene or octamethylene.

In the foregoing structural formula the radicals R and R' can be lower alkyl radicals such as methyl, ethyl, straight-chained and branch-chained propyl, butyl, amyl and hexyl. The radical NRR' can also be a nitrogen containing heterocyclic radical such as a piperazino, N'-alkyl-piperazino, thiamorpholino, quinolino, and isoquinolino radical. But of special interest for the purpose of this invention are compounds in which NRR' is a morpholino radical or in which R and R' are combined to form a lower alkylene group containing 4 to 7 carbon atoms, 4 to 5 of which are in nuclear position as in the case of pyrrolidino, piperidino, 2,5-dimethylpyrrolidino, and 2,6-lupetidino radicals.

The esters which constitute this invention are conveniently prepared by heating a cycloalkyl chloroformate of the structural type

with an amine of the type

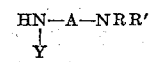

all symbols being defined as hereinabove.

For the purposes of this invention it is often preferable to employ the salts of the organic bases described herein. These bases form salts with a variety of inorganic and strong organic acids including sulfuric, phosphoric, hydrochloric, hydrobromic, hydriodic, sulfamic, acetic, benzoic, citric, lactic, maleic, malic, succinic, tartaric, cinnamic, gluconic, ascorbic, and related acids. They also form quaternary ammonium salts with a variety of organic esters of sulfuric, hydrohalic, and aromatic sulfonic acids. Among such esters are methyl chloride, bromide, and iodide; the ethyl halides, propyl halides, butyl halides, isobutyl halides, benzyl halides, phenethyl halides, naphthylmethyl halides, dimethyl sulfate, methyl benzenesulfonate, ethyl toluenesulfonate, ethylene chlorohydrin, ethylene bromohydrin; the propylene halahydrins, allyl chloride, methallyl bromide and crotyl bromide.

The carbamic acid esters which constitute this invention are valuable as intermediates in organic synthesis. They are of value because of their medicinal action, especially their effects on cardiovascular, neuro-muscular, and other organ functions; they find particular utility in combatting hypertension and neuro-muscular spasms.

My invention will appear more fully from the following examples which are set forth for the purpose of illustrating this invention but are in no way to be construed as limiting it in spirit or in scope. It will be apparent to those skilled in the art that many modifications in materials and methods can be practiced without deviating from the invention. In these examples quantities of materials are indicated as parts by weight, pressures during vacuum distillation in millimeters (mm.) of mercury, and temperatures in degrees centigrade (°C.).

EXAMPLE 1

*Cyclohexyl ester of N-(β-diethylaminoethyl)-cyclohexanecarbamic acid*

A mixture of 162 parts of cyclohexyl chloroformate and 198 parts of N-(β-diethylaminoethyl)hexahydroaniline in 2700 parts of benzene is heated at reflux temperature for 12 hours, cooled and treated with dilute hydrochloric acid. The aqueous layer is separated, rendered alkaline by addition of sodium hydroxide, and extracted with ether. This extract is dried over anhydrous potassium carbonate, filtered and evaporated. The residual oil consisting of the cyclohexyl ester of N-diethylaminoethylcyclohexanecarbamic acid is distilled at about 167–168° C. and 2 mm. pressure.

An ether solution of this base is treated with one equivalent of a 25% solution of hydrogen chloride in anhydrous isopropanol and stored at 0° C. until the crystalline hydrochloride precipitates. The salt, which melts at about 116–117° C., has the structural formula

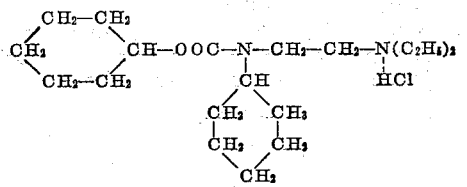

EXAMPLE 2

*Cyclopropyl ester of N-(γ-lupetidinopropyl)-cyclopropanecarbamic acid*

A mixture of 10 parts of cyclopropyl chloroformate and 20 parts of N-(γ-cyclopropylaminopropyl)lupetidine in 50 parts of toluene is heated at reflux temperature for 15 hours and then cooled and extracted with dilute hydrochloric acid. The extract is washed with ether, rendered alkaline by addition of ammonium hydroxide, and extracted with ether. This extract is dried over anhydrous calcium sulfate, stirred with decolorizing charcoal, filtered and evaporated to yield the cyclopropyl ester of N-(γ-lupetidinopropyl)cyclopropanecarbamic acid as a high boiling, orange oil which has the structural formula

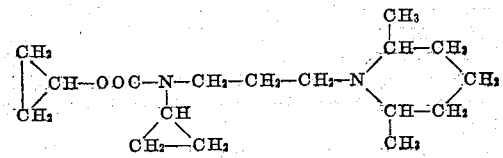

EXAMPLE 3

*Cyclohexyl ester of N-(β-diethylaminoethyl)-carbanilic acid*

162 parts of cyclohexyl chloroformate and 192 parts of N-(β-diethylaminoethyl)aniline in 2600 parts of benzene are mixed and heated at reflux temperature for 12 hours. The solution is then cooled and treated with dilute hydrochloric acid. The aqueous layer is separated, rendered alkaline by addition of potassium hydroxide, and extracted with ether. This extract is dried over anhydrous potassium carbonate, filtered and evaporated to yield as a residue the cyclohexyl ester of N-diethylaminoethylcarbanilic acid which is distilled at about 162–163° C. and 2 mm. pressure. This oil has the structural formula

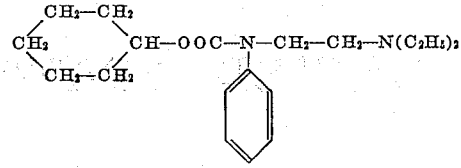

EXAMPLE 4

*3-methylcyclopentyl ester of N-(δ-dimethylaminobutyl)-α-naphthalenecarbamic acid*

A mixture of 81 parts of the 3-methylcyclopentyl chloroformate and 107 parts of N-(δ-dimethylaminobutyl)-α-naphthylamine in 2000 parts of benzene is heated at reflux temperature for 20 hours. After cooling the mixture is extracted with dilute hydrochloric acid and the acidic layer is separated, washed with ether, rendered alkaline by addition of dilute potassium hydroxide, and extracted with ether. The resulting ether extract is dried over anhydrous calcium sulfate, stirred with decolorizing charcoal, filtered, and evaporated to yield the 3-methylcyclopentyl ester of N-(δ-dimethylaminobutyl)-α-naphthalenecarbamic acid as a high boiling, amber oil which has the structural formula

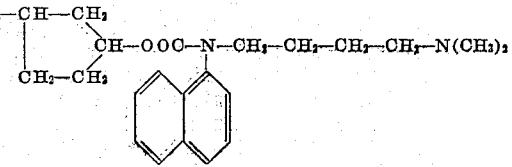

EXAMPLE 5

*Cyclohexyl ester of N-(β-morpholinoethyl)-benzylcarbamic acid*

A mixture of 162 parts of cyclohexyl chloroformate and 220 parts of N-(β-benzylaminoethyl)morpholine in 2600 parts of benzene is heated at reflux temperature for 12 hours, cooled, and treated with dilute hydrochloric acid. The aqueous layer is separated, rendered alkaline, and extracted with ether. The ether extract is dried over anhydrous potassium carbonate, filtered and evaporated to yield the cyclohexyl ester of N-(β-morpholinoethyl)benzylcarbamic acid which is distilled at about 196–197° C. and 2 mm. pressure.

An ether solution of this base is treated with alcoholic hydrogen chloride. The oily hydrochloride precipitates at once and solidifies within a few minutes. Recrystallized from a mixture of ethyl acetate and isopropanol, the salt melts at about 146–147° C. It has the structural formula

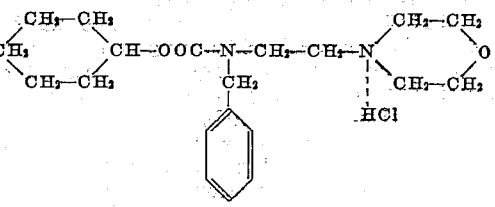

EXAMPLE 6

*Cyclohexyl ester of N-(β-diethylaminoethyl)-2-methyl-1,2,3,6-tetrahydrobenzylcarbamic acid*

A mixture of 372 parts of 2-methyl-1,2,3,6-tetrahydrobenzaldehyde and 400 parts of N,N- diethylethylenediamine is hydrogenated with 20 parts of Raney nickel and 100 parts of a 1% chloroplatinic acid solution in 1200 parts of ethanol at 30 lbs. pressure for 10 hours in a Parr bomb. The contents of the bomb are filtered and the filtrate is concentrated and treated with dilute hydrochloric acid. The acidic layer is rendered alkaline by addition of dilute sodium hydroxide and extracted with ether. The ether extract is dried over anhydrous potassium carbonate, filtered, and evaporated. The N-diethylaminoethyl - 2 - methyl-1,2,3,6-tetrahydrobenzylamine thus obtained is distilled at about 95–96° C. and 2 mm. pressure.

228 parts of this base are mixed with 162 parts of cyclohexyl chloroformate in 1750 parts of benzene. A vigorous reaction starts at once. The reaction is completed by heating at reflux temperature for 2 hours after which the mixture is treated with dilute hydrochloric acid. The acidic layer is separated, rendered alkaline by addition of dilute potassium hydroxide and extracted with ether. This extract is dried over anhydrous potassium carbonate, filtered, and evaporated to leave the cyclohexyl ester of N-diethylaminoethyl - 2 - methyl-1,2,3,6-tetrahydrobenzylcarbamic acid which is distilled at about 172–174° C. and 2 mm. pressure.

An ether solution of this base is treated with alcoholic hydrogen chloride and the resulting solution is stored at 0° C. until a precipitate forms. Recrystallized from ether the hydrochloride melts at about 107–108° C. It has the structural formula

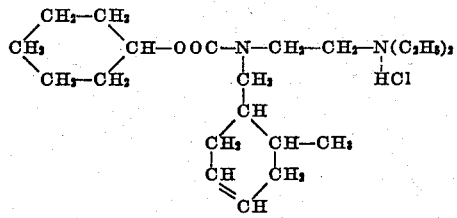

I claim:
1. The new group of organic compounds consisting of the esters of the structural formula

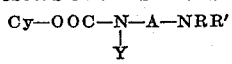

and the salts thereof, wherein Cy is a lower cycloalkyl radical containing 3 to 6 carbon atoms in nuclear position, Y is a homocyclic hydrocarbon radical containing 3 to 10 carbon atoms, A is a bivalent, saturated, aliphatic hydrocarbon radical containing 2 to 8 carbon atoms, and NRR' is a member of the class consisting of lower dialkylamino radicals, morpholino radicals, and radicals in which R and R' are combined to form a lower alkylene chain containing 4 to 7 carbon atoms between 4 and 5 of which are in nuclear position.

2. The esters of the structural formula

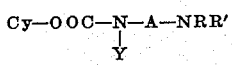

wherein Cy and Y are lower cycloalkyl radicals containing 3 to 6 carbon atoms in nuclear position, A is a bivalent, saturated, aliphatic hydrocarbon radical containing 2 to 8 carbon atoms, and R and R' are lower alkyl radicals.

3. The esters of the structural formula

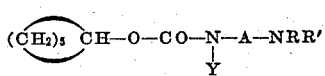

wherein Y is a lower cycloalkyl radical containing 3 to 6 carbon atoms in nuclear position, A is a bivalent, saturated, aliphatic hydrocarbon radical containing 2 to 8 carbon atoms, and R and R' are lower alkyl radicals.

4. The esters of the structural formula

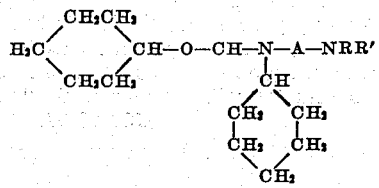

wherein A is a bivalent, saturated, aliphatic hydrocarbon radical containing 2 to 8 carbon atoms, and R and R' are lower alkyl radicals.

5. The esters of the structural formula

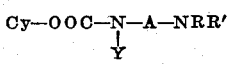

wherein Cy is a lower cycloalkyl radical containing 3 to 6 carbon atoms in nuclear position, Y is a lower aromatic hydrocarbon radical containing 6 to 10 carbon atoms, A is a bivalent, saturated, aliphatic hydrocarbon radical containing 2 to 8 carbon atoms, and R and R' are lower alkyl radicals.

6. The esters of the structural formula

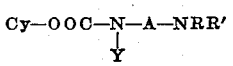

wherein Cy is a lower cycloalkyl radical containing 3 to 6 carbon atoms in nuclear position, Y is a phenyl radical, A is a bivalent, saturated, aliphatic hydrocarbon radical containing 2 to 8 carbon atoms, and R and R' are lower alkyl radicals.

7. The esters of the structural formula

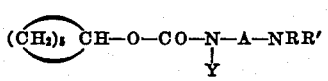

wherein Y is a phenyl radical, A is a bivalent, saturated, aliphatic hydrocarbon radical containing 2 to 8 carbon atoms, and R and R' are lower alkyl radicals.

8. The esters of the structural formula

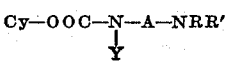

wherein Cy is a lower cycloalkyl radical containing 3 to 6 carbon atoms in nuclear position, Y is a lower phenylalkyl radical, A is a bivalent, saturated, aliphatic hydrocarbon radical containing 2 to 8 carbon atoms, and R and R' are lower alkyl radicals.

9. The esters of the structural formula

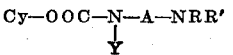

wherein Cy is a lower cycloalkyl radical containing 3 to 6 carbon atoms in nuclear position, Y is a benzyl radical, A is a bivalent, saturated, aliphatic hydrocarbon radical containing 2 to 8 carbon atoms, and R and R' are lower alkyl radicals.

10. The esters of the structural formula

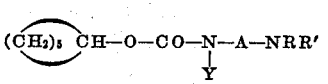

wherein Y is a benzyl radical, A is a bivalent, saturated, aliphatic hydrocarbon radical containing 2 to 8 carbon atoms, and R and R' are lower alkyl radicals.

11. The esters of the structural formula $$Cy-OOC-N-A-NRR'$$
$$\phantom{Cy-OOC-N-}|$$
$$\phantom{Cy-OOC-N-}Y$$

wherein Cy is a lower cycloalkyl radical containing 3 to 6 carbon atoms in nuclear position, Y is a lower hydrogenated phenylalkyl hydrocarbon radical, A is a bivalent, saturated, aliphatic hydrocarbon radical containing 2 to 8 carbon atoms, and R and R' are lower alkyl radicals.

JOHN W. CUSIC.

References Cited in the file of this patent

UNITED STATES PATENTS

| Number | Name | Date |
|---|---|---|
| 2,520,586 | Weber | Aug. 29, 1950 |

OTHER REFERENCES

Leffler et al., J. Am. Chem. Soc., vol. 70, page 3440, 1948.